United States Patent [19]

Loskorn

[11] Patent Number: 4,520,452
[45] Date of Patent: May 28, 1985

[54] MEMORY SELECTION IN A MULTIPLE LINE ADAPTER ORGANIZATION

[75] Inventor: Richard A. Loskorn, Dana Point, Calif.

[73] Assignee: Burroughs Corporation, Detroit, Mich.

[21] Appl. No.: 649,148

[22] Filed: Sep. 10, 1984

Related U.S. Application Data

[63] Continuation-in-part of Ser. No. 358,651, Mar. 16, 1982, abandoned.

[51] Int. Cl.³ .................... G06F 15/16; G06F 13/00; G06F 3/00
[52] U.S. Cl. ........................................ 364/900
[58] Field of Search ... 364/200 MS File, 900 MS File

[56] References Cited

U.S. PATENT DOCUMENTS

| | | | |
|---|---|---|---|
| 3,842,405 | 10/1974 | Key et al. | 364/200 |
| 4,016,548 | 4/1977 | Law et al. | 364/200 |
| 4,093,981 | 6/1978 | McAllister et al. | 364/200 |
| 4,156,907 | 5/1979 | Rawlings et al. | 364/200 |
| 4,189,769 | 2/1980 | Cook et al. | 364/200 |
| 4,205,373 | 5/1980 | Shah et al. | 364/200 |
| 4,225,919 | 9/1980 | Kyu et al. | 364/200 |
| 4,254,462 | 3/1981 | Raymond et al. | 364/200 |
| 4,261,033 | 4/1981 | Lemay et al. | 364/200 |
| 4,291,372 | 9/1981 | Forbes et al. | 364/200 |
| 4,292,667 | 9/1981 | Catiller et al. | 364/200 |
| 4,292,669 | 9/1981 | Wollum et al. | 364/200 |
| 4,293,909 | 10/1981 | Catiller et al. | 364/200 |
| 4,363,093 | 12/1982 | Davis et al. | 364/200 |
| 4,385,382 | 5/1983 | Goss et al. | 364/200 |
| 4,387,425 | 6/1983 | El-Gohary | 364/200 |
| 4,388,686 | 6/1983 | Haid | 364/200 |

Primary Examiner—James D. Thomas
Assistant Examiner—William G. Niessen
Attorney, Agent, or Firm—Alfred W. Kozak; Nathan Cass; Kevin R. Peterson

[57] ABSTRACT

A data-comm network uses multiple line adapters for controlling communication with various data terminals. Each line adapter, and also a data-link interface unit, has its own RAM memory means for buffering of data. An associated microprocessor permits selection of any particular line adapter and its RAM memory means or selection of the data-link-interface unit RAM memory means.

5 Claims, 6 Drawing Figures

"LOCAL" RAM STORAGE MEANS FOR MULTIPLE LINE ADAPTER CARD.

NOTES: (i) INPUT A11 USED TO SELECT UPPER/LOWER AREA OF RAM.
(ii) THE "+" SYMBOL INDICATES AN "OR" OPERATION.
(iii) GATE A₀ ACTIVATES ON SIGNAL FROM DES0 "OR" DES1 "AND" LARAMSEL FOR CHIP/SELECT.
(iv) GATE A₃ ACTIVATES ON SIGNAL FROM DES2 "OR" DES3 "AND" LARAMSEL FOR CHIP/SELECT.

MEMORY SELECTION IN A MULTIPLE LINE ADAPTER ORGANIZATION

This application is a continuation-in-part of application Ser. No. 358,651, filed Mar. 16, 1982, now abandoned.

FIELD OF THE INVENTION

This disclosure relates to line adapters used in data-comm networks in combination with a microprocessor for controlling operations in a multiple line adapter organization.

CROSS REFERENCES TO RELATED APPLICATIONS

This disclosure is also related to an application entitled "Byte Oriented Line Adapter System", inventors Richard A. Loskorn, Philip D. Biehl, Robert D. Catiller and filed Mar. 5, 1982 as U.S. Ser. No. 355,135.

Incorporated by reference are several patents which form a background and explanation for the use of the line adapters of this disclosure. These patents, which are included by reference, are:

U.S. Pat. No. 4,293,909 entitled "Digital System for Data Transfer Using Universal Input-Output Microprocessor".

U.S. Pat. No. 4,291,372 entitled "Microprocessor System With Specialized Instruction Format".

U.S. Pat. No. 4,292,667 entitled "Microprocessor System Facilitating Repetition of Instructions".

U.S. Pat. No. 4,189,769 entitled "Input-Output Subsystem for Digital Data Processing System".

SUMMARY OF THE INVENTION

A group of line adapters, each of which handles a particular data-comm line and data terminal, are organized to operate under operative control of a microprocessor. Each line adapter has a RAM memory means provided to it in addition to a data link interface unit which also has a RAM memory means for buffering data transfers to/from a host computer.

Any one of the RAM memory means may be selected and addressed by the microprocessor. This is done through signalling of a "Designate" flip-flop which is associated with each memory means. Address signals from the microprocessor are sent to a Comparator which selects whether a line-adapter RAM or data-link-interface RAM is to be selected. This selection signal is ANDED with a "Designate" flip-flop signal to select which RAM memory for a particular line adapter is to be used. Each "Designate" flip-flop is uniquely identified by having a jumper connection to a different line of the I/O bus from the microprocessor which can "set" (=1) a signal on the I/O bus line which identifies the selected flip-flop.

MEMORY SELECTION IN BIT ORIENTED LINE ADAPTER; DESCRIPTION OF THE PREFERRED EMBODIMENTS

The "Bit-Oriented" Line Adapter is a device which is used to perform the function of interfacing a parallel digital system to a serial data communications channel employing HDLC/SDLC/BDLC line protocol. HDLC refers to High Level Data Link Control as developed by the International Organization for Standardization (ISO). SDLC refers to Synchronous Data Link Control as developed by IBM Corp. The term BDLC refers to Burroughs Data Link Control as developed by the Burroughs Corp., Detroit, Mich.

The Line Adapter is operated under the control of the State Machine 600 of the Line Support Processor (LSP). The LSP also sometimes called a Frame Recognition-Data Link Processor, FR-DLP.

Figure 2:
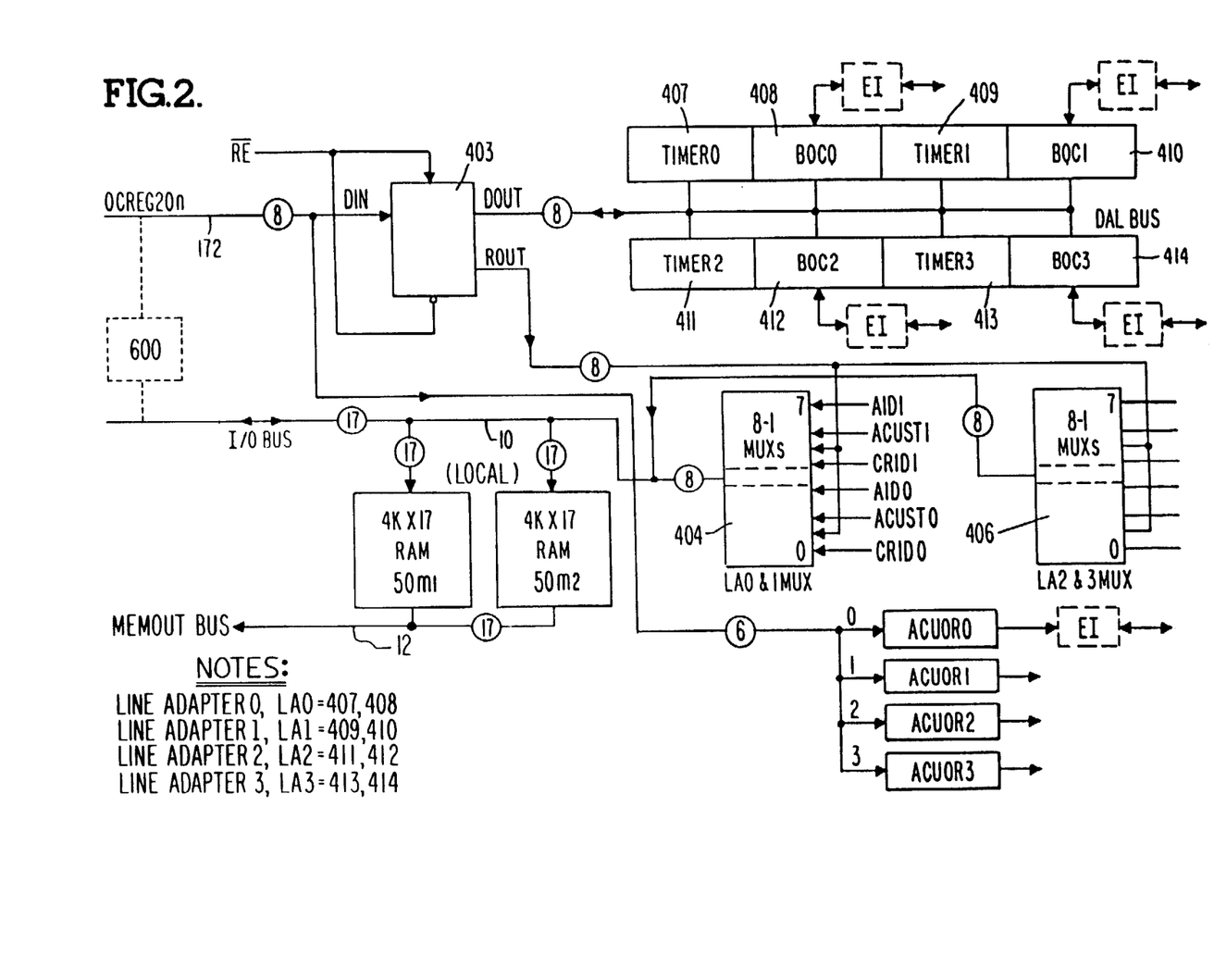
FIG. 2 is a block diagram of a bit-oriented line adapter in the multiple or quad version.

The major elements of the Bit Oriented Line Adapter are; (FIG. 2):

(a) 2048 words of RAM (b) A Bit-Oriented Controller (BOC) chip (c) A Timer chip which generates time references as required by the Line Support Processor and the clocks required by the Bit-Oriented Controller (BOC).

(d) Logic Circuitry to implement the automatic dialing function.

(e) A Transceiver.

The Bit Oriented Line Adapter can exist in two versions: (i) a "Quad" version (FIG. 2) which contains four complete adapters on one profile card of chips, and (ii) a "Dual" or single version which is simply a diminished quad card.

Each adapter section of a Quad card or a Dual-Quad card is cabled to a "line interface card" (Electrical Interface, EI, FIG. 2) which converts the TTL level of the adapter to the levels required by the communications channel. A unique line interface card type exists for each kind of electrical interface.

Line Adapter Organization

FIG. 2 is a block diagram of the "Bit Oriented" Line Adapter 400 in the version called the Quad Line Adapter card.

A transceiver 403 receives input data on line $17_2$ which is designated as the DIN or data input line. This line comes from the second Output Control Register 38 of the State Machine Processor 600 shown in FIG. 3.

Since this Line Adapter is a "Quad", there are four BOC's or Bit Oriented Controllers 408, 410, 412, and 414, each connecting to a separate electrical interface EI (each of which connects to its own data comm line or modem or data set). Likewise there are 4 Timers 407, 409, 411 and 413 which operate with the respective Bit Oriented Controllers. The Bit Oriented Controllers have a data access line (DAL) bus which connects to the Transceiver 403 by means of line DOUT (data out line).

Also connecting to the Transceiver 403 is the Read Enable signal (RE) from the State Machine Processor 600. The Transceiver 403 also has an output line designated ROUT (Read-Out) which line provides input to multiplexors 404 and 406. Since this is a Quad Line Adapter unit, the element 404 represents two multiplexors while the element 406 represents two more multiplexors for a total of four. The I/O bus 10 of the State Machine Processor connects, in FIG. 2, to "external" RAM memories $50_{m1}$ and $50_{m2}$ in addition to both multiplexors 404 and 406. The output of the RAM memory $50_{m1}$, $50_{m2}$ connects to the Memory Out bus 12, which enters the State Machine Processor of FIG. 3.

The data from the Second Control Register 38 of the State Machine Processor 600 enters on line $17_2$ and also connects to the Automatic Calling Unit Output Register (ACUOR) 405. Since this is a Quad Line Adapter, there are actually four ACU registers designated 0,1,2,3, on FIG. 2. The output of each of these Automatic Calling Unit registers feeds to an electrical interface (EI) which connects to a Automatic Calling Unit.

In FIG. 2 the ROUT line feeds input data to multiplexors 404 and 406. In addition, multiplexors 404 and 406 receive a series of input control signals which are associated with each separate data communication line.

The Transceiver 403 consists of 4 pairs of 3-state logic elements which are configured as Quad bus drivers/receivers along with separately buffered Receiver Enable and Driver Enable lines. A typically preferred integrated circuit package which embodies these features is built by the Signetics Company of Sunnyvale, Calif. and designated as the 8T26 3-state Quad Bus Transceiver. RANDOM ACCESS MEMORY: In the Bit-Oriented Line Adapter in the Quad versions of FIG. 2, the Quad BOC (bit-oriented controller) has 8,192 words of RAM (memory) which are portioned equally among the four adapter sections. The memory consists of 34 static RAM ICs (each of 4,096X1) which provide a total of 8,192 words of memory or 2,048 words per each adapter section. Each word is 17-bits long and includes 1 parity bit.

The Random Access Memory $50_{m1}$, $50_{m2}$ (RAM) is used to hold programs, tables and data required by the Line Support Processor (LSP) to service each adapter. Except for the Line Adapter Designate Logic, FIG. 5 (which is used to select a 2,048 word page of RAM as well as to select other addressable elements associated with a particular adapter section) the memory is essentially independent of the remaining logic on the card. Since the 180 nanosecond read-access time of the RAM exceeds the 125 nanosecond clock period, the memory operations require two clock periods.

BIT-ORIENTED CONTROLLER (BOC)

The BOC is a MOS/LSI device housed in a 40 pin Dual-In-Line package and is TTL (Transister-Transister Type Logic) compatible on all inputs and outputs. In the Quad Line Adapter of FIG. 2, there are four Bit-Oriented Controllers 408, 410, 412 and 414. The BOC is composed of registers, receivers, transmitters, and command registers which are described and illustrated in a Western Digital Corp., brochure entitled SD 1933 Synchronous Data Link Controller. These elements will be summarized hereinafter.

The BOC implements the BDLC/SDLC (Burroughs Data Link Control/Synchronous Data Link Control) protocol including zero insertion and deletion, FCS (Frame Check Sequence) generation and checking, automatic detection of special control characters (e.g., FLAG, ABORT, INVALID AND IDLE). The following Table is a brief description of the particular "Frame", which is the basic unit of information transfer in HDLC/SDLC/BDLC;

TABLE I-1

| FLAG | ADDRESS | CONTROL | INFO FIELD | FRAME CHECK SEQUENCE | FLAG |
|------|---------|---------|------------|----------------------|------|

Where:
FLAG =                01111110
Adress                one or more 8 bit bytes
field                 defining the particular station
Control field         one or two 8 bit bytes
Information           Any number of bits (may be
field                 zero bits)
Frame check           16 bit error checking field
Sequence Automatic zero insertion on transmission prevents the occurrance of more than five consecutive "ones" between flags. Inserted "zeros" are deleted by the Receiver. The major elements of the Bit-Oriented Controller (BOC) are:

(i) Receiver Register;
(ii) Receiver Holding Registers;
(iii) Comparator;
(iv) Transmitter Holding Register;
(v) Transmitter Register;
(vi) Command Register.

These six elements of the Bit-Oriented Controller are discussed hereinbelow:

(i) Receiver Register:

This is an 8-bit register which inputs the received data at a clock rate determined by the Receiver clock. The incoming data is assembled to a 5, 6, 7 or 8-bit "character length" and then transferred to the Receiver Holding Register (RHR). At this time the Data Request Input (DRQI) is made active thus informing the State Machine 600 at the Line Support Processor (LSP) that the Receiver Holding Register (RHR) contains data.

(ii) Receiver Holding Register; (RHR):

This is an 8-bit parallel register which presents assembled receiver "characters" to the data bus lines when activated via a "Read" operation. When the Receiver Holding Register is read by the State Machine, then the DRQI is made inactive (DRQI is the Data Request Input signal).

(iii) Comparator:

This is an 8-bit Comparator which is used to compare the contents of the Address Register (in BOC chip) with the address field of the "incoming frame". This feature is enabled by a bit in the Command Register (vi). If it is enabled and there is a match, then the received frame is inputted and DRQI's are generated. If enabled and there is no match, the received frame is discarded. If not enabled, all received frames are inputted to the State Machine of the Line Support Processor (LSP).

(iv) Transmitter Holding Register:

This is an 8-bit register which is loaded with data from the data bus by a "Write" operation. DRQO (Data Request Output) is also reset by the "Write" operation. The data is transferred to the Transmitter Register when the transmitter section is enabled, and the Transmitter Register is ready for new data. During this transfer, data register output (DRQO) is made active in order to inform the State Machine that the Transmitter Holding Register (THR) is again empty.

(v) Transmitter Register:

This is an 8-bit register which is loaded from the Transmitter Holding Register (THR) and which is serially shifted out to the Transmit Data Output. An ABORT or a FLAG may be loaded into this register under program control.

(vi) Command Register:

The command register consists of three 8-bit registers which define the command which is presently in process (e.g., DATA, ABORT, FLAG OR FCS) and it also specifies various other factors defined hereinbelow.

Command Register #1:

This is the first of three 8-bit registers which is organized according to bits 10-17 as shown in the Table below.

TABLE I-2

COMMAND REGISTER 1

| CR17 | CR16 | CR15 | CR14 | CR13 | CR12 | CR11 | CR10 |
|---|---|---|---|---|---|---|---|
| ACT REC | ACT TRAN | TC1 | TC0 | TBL1 | TBL0 | DTR | SPCL OUT |

Bit #17 of the Command Register "1" is designated CR17 and is used as "activate Receiver" bit. This bit when set activates the Receiver which begins searching for frames.

The bit designated CR16 is called "activate Transmitter". This bit, when set, activates the Transmitter and sets RTS (Request to Send). Transmission begins when CTS (Clear to Send) is received. In the "Go-Ahead" mode, the Transmitter waits for a Go-Ahead (0 followed by 7 ones) before executing the command. At the completion of any transmitter command, RTS will drop coincident with the start of the last transmitted bit. To insure that the last transmitted bit clears the data set, RTS is delayed 1-bit-time by means of logic external to the BOC.

The Command Register #1 bits 14 and 15 are Transmitter Commands (TC) which indicate the type of data to be sent according to the Table shown below:

TABLE I-3

| CR15 TC1 | CR14 TC0 | COMMAND | ACTION | |
|---|---|---|---|---|
| 0 | 0 | DATA | DRQO | Data Request-out |
| 0 | 1 | ABORT | INTRQ | ⎫ |
| 1 | 0 | FLAG | INTRQ | ⎬ Interrupt Request |
| 1 | 1 | FCS | INTRQ | ⎭ |

Explanation of Table:

DATA: While this command is active, the Transmitter Holding Register (THR) is transferred into the TR (if the THR is loaded and the TR is done shifting out any previous data). When the THR data is transferred to the TR, a DRQO is generated indicating that the THR is empty. If the THR has not been loaded with a new byte by the time the TR is shifted out, then an INTRQ with the XMIT-Underrun Error bit set is generated and ABORTs are sent without subsequent INTRQs.
When the DATA command is executed while not in a frame and the THR is not loaded, continuous FLAGs without INTRQs will be sent if the AUTO FLAG option is chosen; otherwise continuous ABORTs without INTRQs will be sent until the command is changed or until the THR is loaded.
ABORT: Upon receipt of this command, an ABORT TABLE I-3-continued sequence (8 ones) is loaded into the TR and XMIT operation complete is generated (INTRQ = 1). After the interrupt has been serviced, the command may change. If a new command has not been received by the time the last bit is out of the TR, then another ABORT sequence is loaded into the TR and another interrupt is generated. This sequence continues until the command is changed.
FLAG: Upon receipt of this command, a FLAG (01111110) is loaded into the TR (transmitter register) and "XMIT operation complete" is generated (INTQ = 1). After the interrupt has been serviced, the command may change. If a new command has not been received by the time the last bit is out of the TR, then another FLAG is loaded into the TR and another interrupt is generated. This sequence continues until the command is changed.
Frame Check Sequence (FCS): Upon receipt of this command, the Residual Byte (which the chip automatically transfers into the Transmitter Holding Register, THR) will be sent provided RES2 − RES0 NEQ = 0. Following the Residual Byte there will come the FCS, then a FLAG along with an INTRQ (XMIT operation complete) thus ending the frame. After the interrupt has been serviced, the command may change. If the FCS command is executed while not in a frame, and if AUTO FLAG is not chosen, the Transmitter will send ABORTs without INTRQs. If AUTO FLAG is chosen, continuous FLAGs with INTRQs will be sent.

The Command Register #1 bits 13 and 12 are used as shown in the Table below. The Command Register bit 12 is designated as "Transmitter Byte Length" (TBL) and these bits designate the number of bits per data byte. Each data byte may be 5, 6, 7 or 8 bits long.

TABLE I-4

| (CR13) TBL1 | (CR12) TBL0 | Bits Per Data Byte |
|---|---|---|
| 0 | 0 | 8 |
| 0 | 1 | 7 |
| 1 | 0 | 6 |
| 1 | 1 | 5 |

The Command Register #1 bit 11 designated CR11 is the DTR command; this bit controls the "Data Terminal Ready" (DTR) signal. The DTR, as seen at the data set, will be "on" when bit CR11 is "set" except when the Self-Test mode is selected (that is, when bit CR21 of Command Register #2 is set).

Bit 10 designated CR10 is the "Special Out" bit: this bit controls the Special Out line to the Line Interface card where its name is then changed to Dial Mode (DM). Dial Mode is used in conjunction with DTR for dialing with a Burroughs Auto-Dialing Data Set. DM will be "on" when CR10 is set.

Command Register #2:

This Command Register is illustrated by the Table below:

TABLE I-5

COMMAND REGISTER 2

| CR27 | CR26 | CR25 | CR24 | CR23 | CR22 | CR21 | CR20 |
|---|---|---|---|---|---|---|---|
| CONTROL BYTES | ADDR COMP | EXT ADDR | RBL1 | RBL0 | GA | SELF TEST | AUTO FLAG |

The bit 27 designated as Command Register bit 27 (CR27) represents the number of control bytes. This bit defines the number of control bytes per frame: a "1" specifies two control bytes while a "0" specifies one control byte.

The bit 26 designated CR26 is an "Address Compare Enable" bit. This bit when "set" causes the Receiver to inspect the first incoming address byte. If there occurs: (1) a match with the address register or (2) the address is all ones, then the rest of the frame is inputted. Otherwise the Receiver searches for a new frame. If not set, then all frames are inputted.

The bit 25 designated CR25 is the "Extended Address Enable" bit. This bit will cause the receiver to input another address byte if the least significant bit of the current address byte is "zero".

The bits of CR24 and CR23 are the "Receiver Byte Length" bits (RBL). These bits specify the byte size of a received I-frame. The I field bytes may be 5, 6, 7 or 8 bits long.

TABLE I-6

| (CR24) RBL1 | (CR23) RBL0 | Bits Per Byte |
|---|---|---|
| 0 | 0 | 8 |
| 0 | 1 | 7 |
| 1 | 0 | 6 |
| 1 | 1 | 5 |

In Table I-5, the bit CR22 is the "GO-AHEAD" bit. This bit when "set" causes the BOC to work in the "Go-Ahead" mode as used in a loop type configuration. "Loop operation" (in the bit-synchronous mode) is a method of line operation in which several stations are connected together in a loop, such that each secondary station must "pass on" all frames which are not addressed to it.

The 21-bit designated as CR21 is the "Self-Test Mode" bit. This bit, when set, deactivates the DTR and causes the Transmitter output to be connected to the Receiver input internally within the BOC chip. This data is also seen at the transmitted data line.

The bit-20 designated CR20 is the "Auto Flag" bit. Here the Transmitter will send continuous flags without INTRQs if the bit CR20 is "set", and the DATA command (CR15, CR14="00") is executed while not in a frame and THR is not loaded. If CR20 is not set, but the other two conditions are met, then continuous ABORTs without INTRQs will be sent until the command is changed or the THR (Transmitter Holding Register) is loaded. The purpose of this bit is to eliminate the necessity of executing a FLAG command at the beginning of a frame.

Command Register #3:

This register includes bits 30 through 37 and is shown on the Table below.

TABLE I-7

COMMAND REGISTER 3

| CR37 | CR36 | CR35 | CR34 | CR33 | CR32 | CR31 | CR30 |
|---|---|---|---|---|---|---|---|
| UNUSED | UNUSED | UNUSED | UNUSED | UNUSED | RBL2 | RBL1 | RBL0 |

As seen above, the bits 33-37 are not used, however bits CR30, CR31, CR32, are used to determine what length the Residual Byte will be. This is shown in the Table hereinbelow.

TABLE I-8

| CR32 Res2 | CR31 Res1 | CR30 Res0 | Resident Byte Length |
|---|---|---|---|
| 0 | 0 | 0 | no residual byte sent |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

If no Residual Byte is to be sent, then the bits CR30-CR32 must be set to "0".

To end a frame, the following three actions must be done within 5 transmit clocks following the turn-on of DRQO. This may be done however in any order, as follows:

1. load Transmitter Holding Register (THR) with the last character or the residual.
2. load CR3 with the Residual Byte length.
3. change the Transmitter Command to FCS.

Status Register:

The Status Register is organized as shown below using register bits 0-7. The Table hereinbelow will show their usage.

TABLE I-9

STATUS REGISTER

| SR7 | SR6 | SR5 | SR4 | SR3 | SR2 | SR1 | SR0 |
|---|---|---|---|---|---|---|---|
| RI | CD | DSR | SPCL IN | RCV IDLE | AF/or IF/RES2 | ORUN/ RES1 | CRC1 RES0 |

SR7 - RING INDICATOR  
SR6 - CARRIER DETECT  
SR5 - DATA SET READY  
SR4 - SPECIAL IN MISCELLANEOUS

Miscellaneous bits here are bits 4, 5, 6, 7 which will be "set" when the signal they represent, as seen at the Data Set, is "on". "Special In" (SPCL IN) is used with the "Byte-Oriented" Line Adapter for Reverse Channel Receive, or Restraint Detected. Neither of these functions are applicable to the "Bit-Oriented" Line Adapter. Consequently, "Special In" is unused and thus SR4 will always be in the "reset" state.

Bit-3 designated SR3 is the "Receive Idle" bit. This bit is set when 15 "ones", denoting a station IDLE condition, have been received.

The bits of the Status Register designated "0→2" (SR0, SR1, SR2) are used as the "Received Error Bits/-Residual Count bits. If a Received End of Message (REOM) without errors is received, then the bits SR2-SR0 indicate the number of residual bits on the last byte according to the following Table:

TABLE I-10

| RESIDUAL COUNT (BINARY VALUE OF SR2-SR0) | SPECIFIED BYTE LENGTH | | | |
|---|---|---|---|---|
| | 5 | 6 | 7 | 8 |
| 0 | NA | NA | NA | 0 |
| 1 | 1 | 1 | 1 | 1 |
| 2 | 2 | 2 | 2 | 2 |

TABLE I-10-continued

| RESIDUAL COUNT (BINARY VALUE OF SR2-SR0) | SPECIFIED BYTE LENGTH | | | |
|---|---|---|---|---|
| | 5 | 6 | 7 | 8 |
| 3 | 3 | 3 | 3 | 3 |
| 4 | 4 | 4 | 4 | 4 |
| 5 | 0 | 5 | 5 | 5 |
| 6 | NA | 0 | 6 | 6 |
| 7 | NA | NA | 0 | 7 |

For residual values other than zero, the last byte contains the residual plus a portion of the closing flag.

If a REOM with errors is received, then SR2–SR0 define the error as follows:

SR2, when "on", indicates an aborted frame or an invalid frame, that is, a frame with less than 32-bits.

SR-1, when "on", indicates an Overrun Error (DRQI not serviced) SR0 when "on" indicates a CRC error, (Cyclic Redundancy Check).

BOC Interface Control:

BOC refers to the Bit-Oriented Controller.

The following signals comprise the BOC Interface Control signals: The usual state is a logic 0 (ground) when the signal mneumonic indicates inversion and is a logic 1 (plus 5-volts) otherwise:

(i) CS refers to Chip Select
(ii) WE refers to Write Enable
(iii) RE refers to Read Enable
(iv) A0, A1, A2 refer to the Register Address, and these signals are Bit-Oriented Controller (BOC) signals as seen in the following Table where H (High) equals plus 5-volts and L (Low) equals ground as measured at the BOC.

TABLE I-11

| $\overline{A2}$ | $\overline{A1}$ | $\overline{A0}$ | REGISTER READ | WRITE |
|---|---|---|---|---|
| H | H | H | CR1 | CR1 |
| H | H | L | CR2 | CR2 |
| H | L | H | CR3 | CR3 |
| H | L | L | RHR | AR |
| L | H | H | IR | THR |
| L | H | L | SR | — |

Service Requests (Interrupts):

These signals are defined as follows:

(i) DRQI—this is the Data Request Input: this signal output, when high, indicates that the Receiver Holding Register (RHR) contains valid data. The signal DRQI causes a service request to the LSP-DLP and will be reset when RHR is reset. The signal DRQI also sets bit 2 of the Interrupt Register.

(ii) DRQO—Data Request, Output: this output, when high, indicates that the Transmitter Holding Register (THR) is empty. DRQO will be reset when a character is written into the Transmitter Holding Register but will remain high between the conclusion of data and the end of the frame. To avoid generating a continuous service request during this period, the signal DRQO is logically ended with NB8/ of the ACUOR register. The service request resulting from the signal DRQO can be dropped by writing a "one" bit in ACUOR (4:1) NB8. A service request resulting from a DRQI or INTRQ will not be suppressed by this action. The signal DRQO also sets bit 1 of the Interrupt Register.

(iii) INTRQ—Interrupt Request: this output, when high, indicates that there are one or more bits set in the bit positions 3 through 7 of the Interrupt Register. The signal INTRQ causes a service request to the LSP-DLP and will be reset when the Interrupt Register is read. The Interrupt Register is shown in Table I-12.

TABLE I-12

INTERRUPT REGISTER

| IR7 | IR6 | IR5 | IR4 | IR3 | IR2 | IR1 | IR0 |
|---|---|---|---|---|---|---|---|
| REOM no err. | REOM errs. | XMIT opcom w/no errs. | XMIT opcom with under-run | DSC | DRQI | DRQO | INTRQ |

IR7 RECEIVED END OF MESSAGE, NO ERRORS -
This bit is set when an End of Message has been detected without error.

IR6 RECEIVED END OF MESSAGE, ERRORS -
This bit is set when an End of Message has been detected with errors. Errors include CRC, Overrun, Invalid Frame, and Aborted Frame as denoted by the Status Register.

IR5 TRANSMIT OPERATION COMPLETE, NO ERRORS -
This bit is set when the command in CR1 has completed without error.

IR4 TRANSMIT OPERATION COMPLETE, ERRORS -
This bit is set when the indicated command in CR1 has completed with an underrun error.

IR3 DATA SET CHANGE -
This bit is set when Carrier Detect, Data Set Ready, or Ring Indicator change state, either from "off" to "on" or vice-versa.

IR2 DRQI: Data Request-Input
IR1 DRQO: Data Request-Output
IR0 INTRQ: Interrupt Request NRZI Option:

The non-return to zero option is under program control and is in effect whenever bit NB4/ of the Auto Call Unit Output Register 405, FIG. 2 (ACUOR) is in the logic 1 state. When this option is chosen the data is encoded to the NRZI format on transmission and decoded from the NRZI format on reception. In NRZI encoding, the output remains in the same state to send a binary 1 and changes state in order to send a binary 0. Since a zero bit is automatically inserted following five contiguous "one" bits anywhere between flags, a level transition is guaranteed to occur at least one every six bits.

The essential purpose of NRZI encoding is to permit "pseudo asynchronous" operation (without "start-stop" bits) in order to eliminate the need for a device such as a synchronous Data Set, to extract the receive clock from incoming data. This permits the use of direct connect devices such as those employed by Burroughs two wire direct interface. Also NRZI encoding allows the use of asynchronous Data Sets in place of the more costly synchronous data sets (in cases where the lower data rate of the asynchronous data set is acceptable).

As with all asynchronous operations, the timing clocks must be locally generated. With the Quad "Bit-Oriented" Line Adapter, FIG. 2, the clocks are generated by a Counter/Timer Chip which must be programmatically set to provide a clock rate which is 32 times the data rate.

The Quad "Bit-Oriented" Line Adapter has strap options for each adapter section. Straps are used to select between timing clocks furnished by a synchronous Data Set, when one is used (or the timing clock is generated internally if the Data Set is not used).

An additional strap provides the control signal (1X/32X) into the SDLC Controller Chip. As previously cited, a preferred synchronous Data Link Controller Chip is that manufactured by Western Digital Corp., and designated SD 1933. The 1X option should be used when operating with a "synchronous" Data Set. The 32X option should be used when operating with an "asynchronous" Data Set or when operating with direct-connect devices.

With a 1X strap setting, the SDLC controller chip (408, 410, 412, 414, FIG. 2) uses the positive transition of the receive clock as a strobe to shift in received-data and uses the negative transition of the transmit clock to shift out each bit of transmitted-data. The maximum allowable data rate is the maximum specified operating speed of the SDLC controller chip which is 1.5 MPBS (megabits per second).

With a 32X strap setting, the SDLC controller chip synchronizes itself to level transitions in the incoming data and determines the center point of the first bit by counting 16 clocks following the data transition. The center point of each subsequent bit is the established by counting 32 clocks from the center point of the receiving bit. Each level transition of the received data initializes the sequence. The maximum controller rate is approximately 47 KBPS (kilobits per second).

The following Table shows the allowable options for three kinds of interfaces.

TABLE I-13

| INTERFACE | NRZI | 32X/ 1X STRAP | CLOCK SOURCE |
|---|---|---|---|
| Synchronous | Not Selected* | 1X | Data Set |
| Asynchronous Data Set | Selected | 32X | Internal |
| Direct Connect | Selected | 32X | Internal |

*NRZI may be selected provided that all stations are using the NRZI format.

Go-Ahead Option:

The "Go Ahead" option is under program control and is in effect when bit CR22 of the BOC's Command Register #2 is set. The Go Ahead option is required for operation within a "loop" arrangement such as shown in the Table below.

TABLE I-14

In such a system, each secondary station is a repeater for messages originating from either the primary or a lower numbered secondary station. A transmission originating from the primary is relayed from the secondary to another secondary until it returns to the primary. A secondary can also originate a transmission provided that the primary and all secondaries of lower number have relinquished the line, that is to say, they have signalled a "Go Ahead" to downstream secondaries. The "Go Ahead" consists of a "zero" followed by 7 "ones". The station relinquishing the line ends its transmission with the ending flag of the frame which is followed immediately by the "Go Ahead".

In actual practice, the primary relinguishes control of the line by following the end flag (of the last frame it is transmitting) with a single "0" bit, after which it holds the transmit line at a constant "1" level. A secondary station will see this as a "Go Ahead" and, providing it has a message to send, will suspend the repeater function and place its own transmission on the line. It will conclude the transmission by sending the "Go Ahead" pattern and then resuming the repeater function.

Whenever a secondary unit sees the "Go Ahead" pattern and wishes to transmit, it replaces the "Go Ahead" pattern by the starting flag of the frame it intends to send. This amounts to changing the eighth bit of the "Go Ahead" pattern from a "one" to a "zero". The Bit Operated Controller (BOC), when operating as a repeater, delays the data by four bits in order to obtain the time to detect the "Go Ahead" pattern and to change it to a flag if it so wishes.

The BOC (408, etc.) will generate Data Interrupts (DRQIs) on "receive" only if a match exists between the value of the address field of a frame and the value held within the Address Register.

Figure 4:
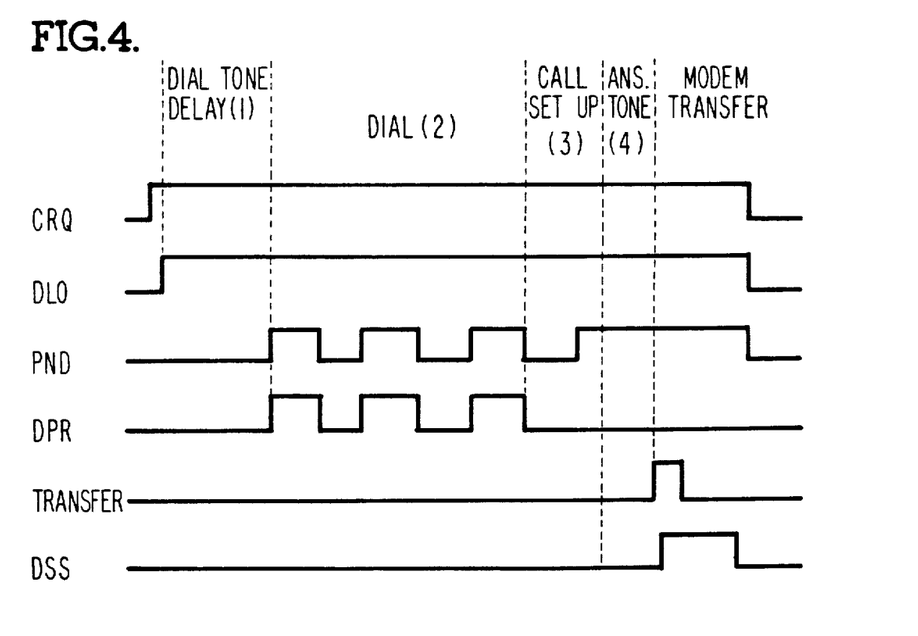
FIG. 4 is a timing diagram showing the sequence of operations for an automatic calling system.

Auto Call Operation:

In usage with a 801 Auto Call Unit, the 801 ACU has a four bit interface for receiving digits of the called number to be dialed. This interface is defined by EIA Standard RS-366 and involves the following signals (FIG. 4):

*44 Call Request CR0; Data Line Occupied DLO; Present Next Digit PND; Digit Present DPR; Data Set Status DSS; Abandon Call and Retry ACR; NB8 NB4 NB2 DIGITS NB1 *11.

In the dialing sequence, the Adapter turns CRQ "on" provided that DLO is off. After detection of the dial tone (which is done by the 801) digits are transferred one at a time to the 801 units. The 801 unit converts the digit to signals which duplicate the function of rotating dial-pulse or Touch-Tone frequency compatible signals. These signals are transmitted to the telephone line. At call completion, DSS comes on to signify receipt of answer tone from the called Data Set. The receipt of DSS allows the line to be transferred to the ACU-associated Data Set. If DSS fails to come on, the Abandon Call and Retry timer (ACR) begins timing out.

With pulse dialing, a typical 10 digit number takes 15 seconds to dial; for Touch-Tone dialing the same number only requires approximately one second. The answer sequence begins sometime after the last digit has been sent by the 801 unit. There are several possible outcomes which are:

(1) voice recording on line; (2) busy signal appears on line; (3) variant code tone appears on the line. (This is a rising and falling tone which indicates that no such telephone number is assigned); (4) Dial tone reappears on the line; (5) nothing happens; (6) Wrong number; (7) the Data Set responds.

The above items (1) through (6) imply that a retry is required. Item (7) is the only successful data call with the remote Data Set responding with an answer tone at 2,025 Hertz (for all Data Sets other than the Western Electric 103). The 103 unit responds at a frequency of 2,225 Hertz.

The 801 unit resolves the unsuccessful calls represented in items (1) through (6) through the use of an "Abandon Call and Retry" (ACR) timer. The time-out interval may be set for a minimum period of 7, 10, 15, 25 or 40 seconds by means of a screwdriver-operated switch located on the 801 unit. For most telephone-switched network operations, a period of 25 or 40 seconds is used to allow sufficient time for the call to go to completion.

Dialing Sequence:

The dialing sequence for the type 801 Automatic Calling Unit (ACU) is shown in FIG. 4. In the Automatic Dialing Sequence, the dial tone (1) varies with the call (CRQ) and is usually less than 3 seconds. For pulse-type dialing, (2) present next digit (PND) is on for 100 milliseconds times the number of pulses, and then is "off" for 600 milliseconds nominally. For Touch-Touch dialing, the signal PND is "on" for 50 milliseconds, and "off" for 70 milliseconds. For call set-up (3), the ACU adapter signals the end of number by not raising (DPR) again. The Answer tone (4) is transmitted at a frequency of 2025 or 2225 Hertz.

OPERATIONS-BIT ORIENTED LINE ADAPTER
(FIG. 2)

Flag Operation:

Service requests are generated by both the Timer and the BOC (Bit Oriented Controller). All service requests from all adapter sections are ORed together to drive a common line. A line named FLAG 2/, which is active low, notifies the State Machine 600 that one or more Line Adapters (LA) are requesting service. The State Machine of the Line Support Processor can determine which adapters are requesting service by executing a GET OP with the variant field V/FLD (4:5)=00001. The Line Adapter (LA) does not need to be designated for the executing of this OP.

A FLAG 2/ which is active as a consequence of the signal DRQO being "on", can be made inactive by writing a "one" bit in ACUOR 406 (4:1) NB 8; a FLAG 2/ which is active as a result of any other service request will not be suppressed by this action.

The multiplexors 404, 406, when properly addressed, will place the state of all of the service requests associated with a designated Line Adapter onto the I/O bus 10.

Data Bus Structure:

With the execption of RAM memory $50_{m1}$, $50_{m2}$ all data which is sent to addressable components in the Line Adapter (LA) will originate from the second "Output Control Register" 38 in the State Machine 600. Likewise, (with the exception of RAM) all data read by the State Machine from addressable components on the Line Adapter will go to the State Machine via the I/O bus 10.

As seen in FIG. 2, the second Output Control Register lines $17_2$ designated OCREG $20_n$ connect directly to the inputs of the Auto Call Unit Output Register 405 (ACUOR) and to the Transceiver 403.

The Auto Call Unit Output Register 405, ACUOR, is a 6-bit "D" type flip-flop register. When the clock input is enabled, data from the Second Output Register on line $17_2$ will be strobed into the Auto Call Unit Output Register 405 (ACUOR).

Data sent to both the Timer (407 et al.) and to the BOC (408 et al.) originate from the Second Output Control Register 38 in the State Machine (FIG. 3) and are sent through the quad bi-directional inverting bus driver-controller (Transceiver 403), then to the components (Timers, BOC's, Registers). Data lines for the Timer are "high" active, and for the BOC, they are "low" active. Since both components share the same data bus (DAL), data to one of the components must be inverted. Thus the Timer is used to receive the inverted data, that is, a 1 is equal to a 0 and a 0 is equal to a 1; and the Bit-Oriented Controller (BOC) receives the conventional signal format. Therefore, a "one" bit from Second Output Register 38 in the State Machine (FIG. 3) will appear as "one" bit to the BOC (active low) and as a "zero" bit to the Timer.

The Transceiver bus controller chip 403, FIG. 2, although being a tri-state device, is never used in its third or high impedance state. It is always either driving the signal DIN to the signal DOUT or else it is driving the signal DOUT to the signal ROUT, depending on the state of RE (Read Enable) signal which originates from bit 4 of the First "Output Control Register" 37 in the State Machine of FIG. 3. When bit 4 of the First Output Register is "on", the signal RE is positive and this enables the DIN-to-DOUT direction to operation through the Transceiver 403. If bit 4 is being "off", this enables the DOUT-to-ROUT direction through the bus controller Transceiver 403.

The reading of information from a Line Adapter (LA) (except the RAM read) is performed by the decoding of GET OPs, and the read information is available on the least significant eight (8) bits of the I/O bus 10. The multiplexors 404, 406 are the source of the read information.

Component Addressing:

There are sixteen 8-1 multiplexors used on the Quad Line Adapter Card. Eight of these multiplexors are used for a "pair" of adapter sections. Selection of one of the 4 input groups allotted to each adapter section is determined by the value of the two least significant bits of the V-FLD of the GET OP, so that V-FLD (3:4) is equal to 11XX. The next following Table defines the various signals placed on the I/O bus 10 as a function of V-1 and V-0.

TABLE I-15

| | | I/O BUS LINES | | | | | | | |
|---|---|---|---|---|---|---|---|---|---|
| | V1V0 | 0 | 1 | 2 | 3 | 4 | 5 | 6 | 7 |
| | 00 | INRQ | PT0 | PT1 | DRQ1 | DRQ0 | — | — | RING |
| SELECTION | 01 | DATA BUS | DATA BUS | DATA BUS | DATA BUS | DATA BUS | DATA BUS | DATA BUS | DATA BUS |
| DECODE | 10 | PND | PWI | DLO | ACR | DSS | RSND/ | CTS | SPCL IN |
| | 11 | ID0 | ID1 | ID2 | ID3 | ID4 | ID5 | ID6 | ID7 |

The data bus is shared by both the Timer and the Bit-Oriented Controller (BOC) so that five components can be handled by a 4 input multiplexor field.

Three components on a Line Adapter (LA) may be written into (not including RAM). These components are the Automatic Calling Unit Register 405 (ACUOR), the Bit-Oriented Controllers 408, 410, 412, 414 (BOC), and the Timers 407, 409, 411, 413, itself. Addressing these three components occurs in two distinct ways—one is the decode of the V-FLD of the PUT OPs and also the decode of bits from the First Output Control Register 37 in the State Machine (FIG. 3).

The Auto Call Unit Output Register 405 (ACUOR) is addressed when a 1 of 8 decoder chip decodes the PUT OP V-FLD (4:5) as equal to 01111 and PUT Strobe-2 is sent from the Line Support Processor. This decoding is performed only on the Single Line Adapter LA card, and is sent to other Line Adapter cards via the frontplane connector, FIG. 1. This decoded signal is received by a three input NOR gate in each Line Adapter whose other inputs are Clock and the Designate FF. The output of the NOR gate drives the clock input of the 6-bit ACU Output Register 405.

Figure 3:
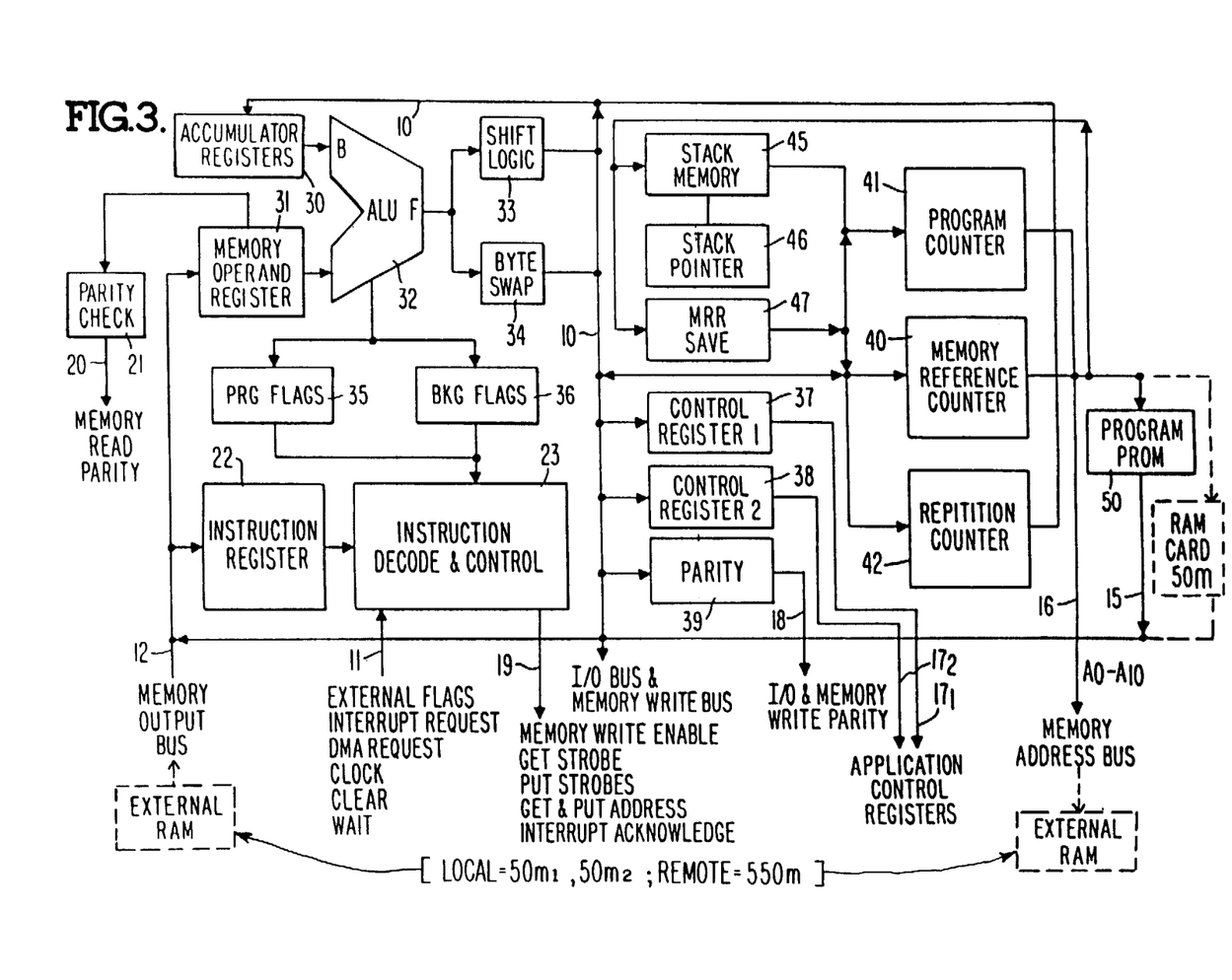
FIG. 3 is a block diagram of the microprocessor used to manage and control the line adapter.

Data from the Second Output Register 38 of FIG. 3 will then be strobed into the Auto Call Unit Output Register 405.

Addressing a Bit-Oriented Controller (BOC) or a Timer on a "designated" Line Adapter (LA) is the same as "chip selecting" the component. This is done with bits 0 and 1 of the First Output Control Register 37 in the State Machine (FIG. 3) along with a flip-flop called the "Designate FF" on a Line Adapter.

Each Line Adapter will AND its "Designate FF" with bits 0 and 1 to provide a UCS (BOC chip Select) or a TCS (Timer chip Select) for its Bit-Oriented Controller (BOC) or its Timer.

Thus in the First Control Register 37, when the zero-bit is equal to 1, then the signal is used as a BOC Chip Select signal; when the First Control Register 37 has its one-bit equal to 1, then the signal is used to select the Timer Chip.

The remaining bits of the First Output Control Register 37 (FIG. 3) are used for control signals primarily for the BOC and the Timer.

Selection of Line Adapter Memory

Figures 5, 5A:
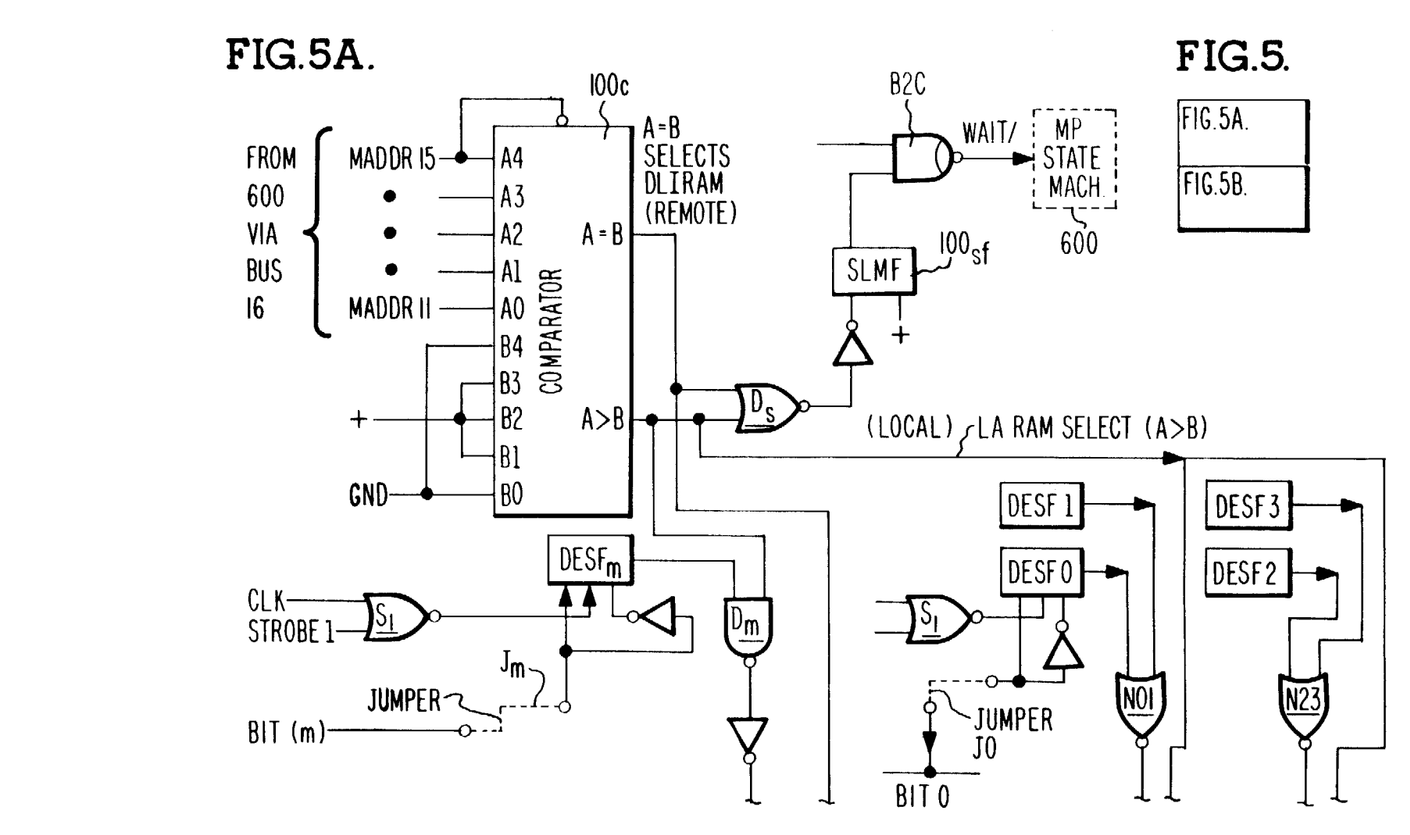
FIG. 5 is a drawing of a data link interface card which provides logic for memory selection.
Figure 5B:
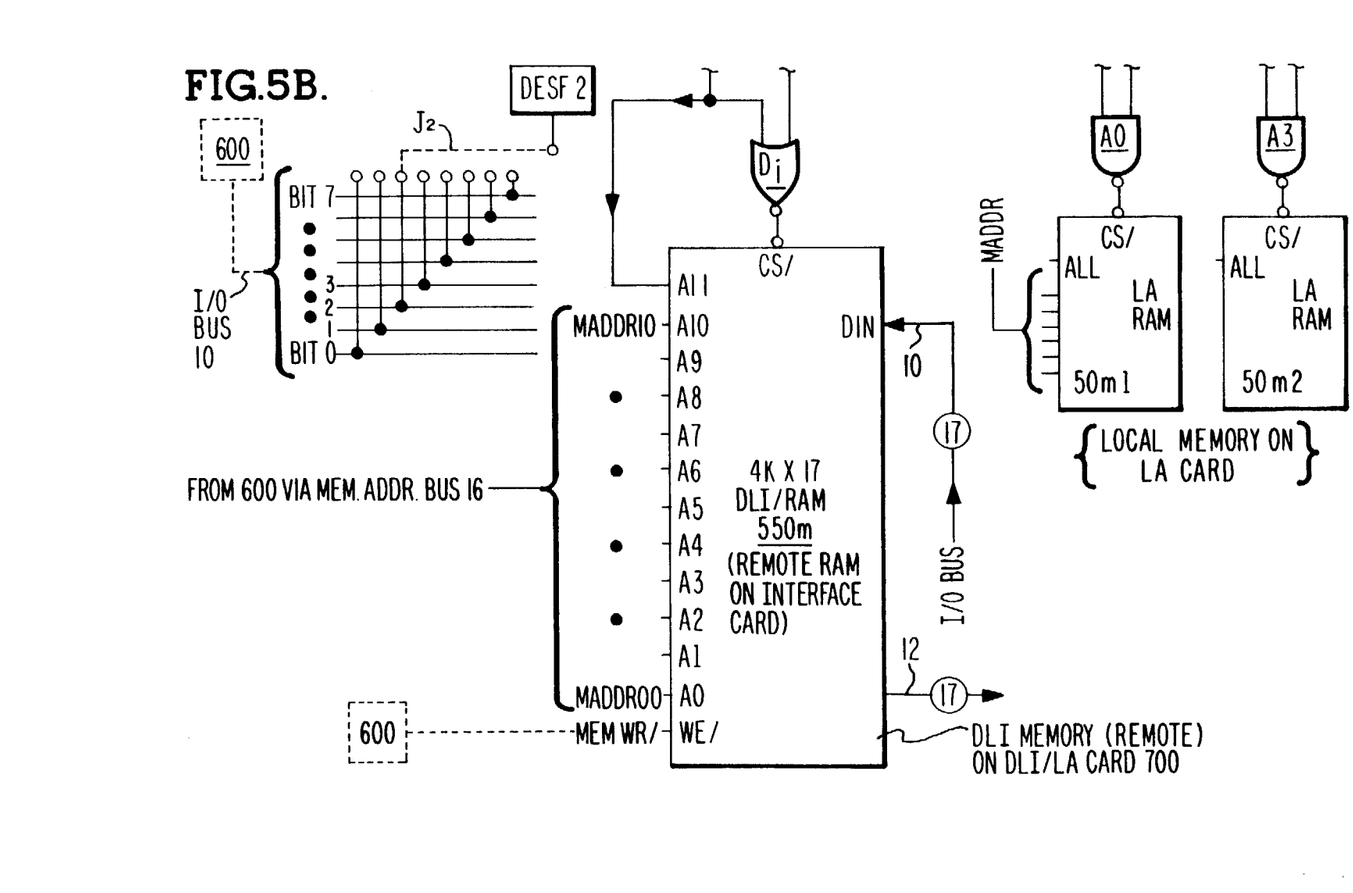

Referring to FIG. 5, it will be seen that several RAM memories such as $550_m$, $50_{m1}$, $50_{m2}$ are available for use by the system.

The RAM memories such as $50_{m1}$ and $50_{m2}$ (FIG. 2) may be considered as "local" in that they reside on the same card location as the Line Adapters LA0, LA1, LA2, LA3.

Figure 1:
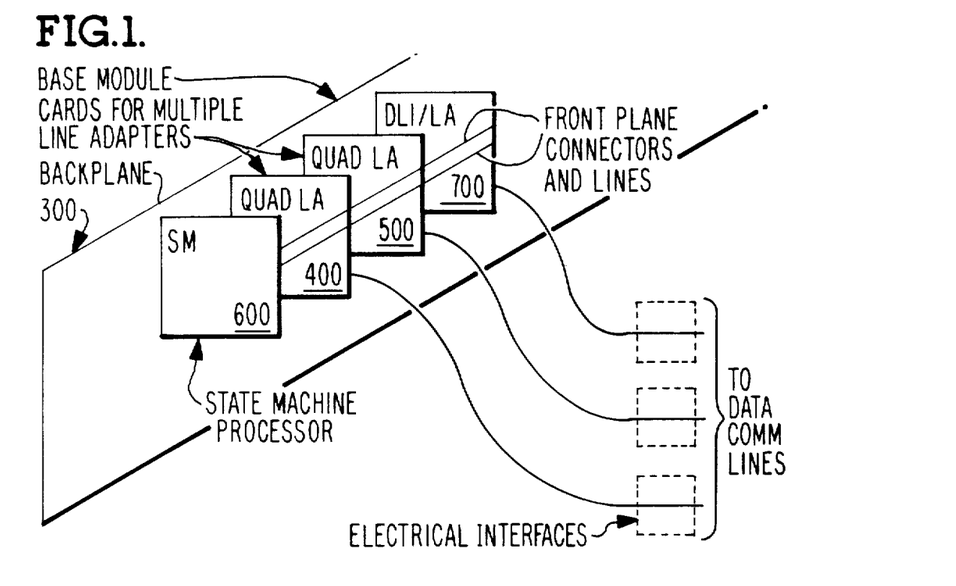
FIG. 1 is a schematic drawing of a base connection module having slide-in cards which connect multiple line adapters, a microprocessor and other interface equipment.

On the other hand, RAM $550_m$ of FIG. 5 resides on the DLI card 700 of FIG. 1 and may be called a "remote" RAM memory.

Assuming that RAM $550_m$ is the memory on the DLI/LA card 700 (of FIG. 1) and the RAM $50_{m1}$ is dedicated for use of Line Adapters LA0 and LA1 (see FIG. 2) while RAM $50_{m2}$ is dedicated for use of LA2 and LA3, it will be noted that each of these RAMs is selected by a chip select signal marked CS/.

Figure 6:
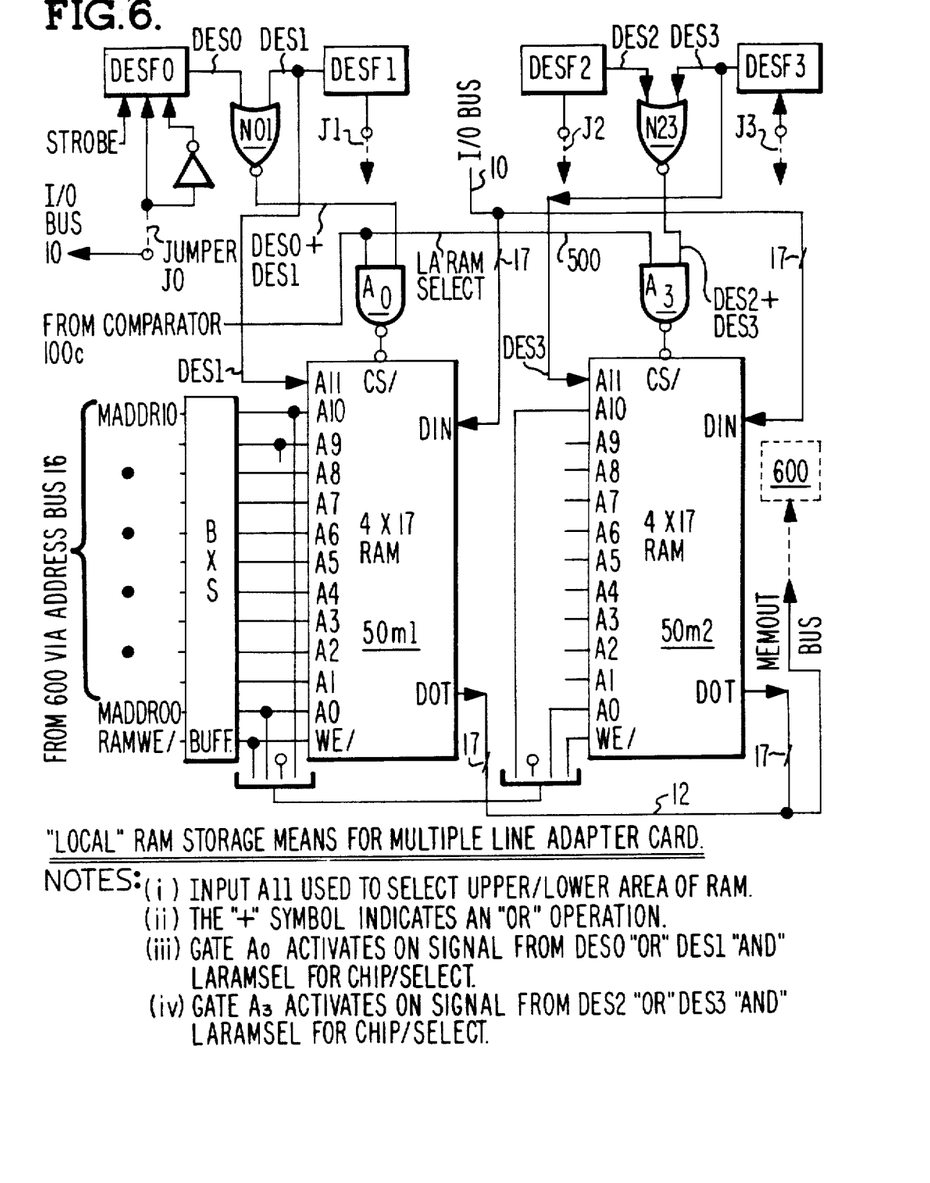
FIG. 6 is a drawing of two RAM memories of which selected areas are dedicated to particular line adapters.

The Chip Select (CS/) signal will be seen to operate as a result of signals from a particular designate flip-flop DESF (as seen in FIG. 6) and certain gating means.

Thus in FIG. 6, the combination of the LARAMSEL (Line Adapter RAM Select signal) and a signal from a particular Designate flip-flop will activate or "select" a given RAM memory.

For example, if either the DESF0 or DESF1 flip-flop outputs are "on", then the output of NOR gate N01 combined with the LARAMSEL signal will enable or "chip select" RAM $50_{m1}$.

Now concurrently, the DES 1 line has an input A11 to RAM $50_{m1}$ such that if line DES 1 is "off" or "false", then the "lower half" of RAM $50_{m1}$ is selected for addressing via the address lines MADDR 0-10. On the other hand, if the DES 1 line was "true" or active, then the "upper half" of RAM $50_{m1}$ would be selected for addressing.

Now as to activation of a particular designate flip-flop (DESF), reference will be made to FIG. 5.

Referring to FIG. 5, there is seen the I/O bus 10 of the State Machine Processor 600. The I/O bus 10 has 17 bit lines of which bit lines 0 through 7 may be used to connect to Jumpers J.

The Jumpers J0 are settable and alterable so that, for example, bit line 0 will connect to Jumper J0 which provides an input to DESF0. Likewise, Jumper J1 connects bit line 1 to DESF1. And Jumper Jn (settable) connects bit line "n" to DESFn.

As discussed hereinafter, the State Machine Processor 600 will activate or "set" a particular bit line in I/O bus 10. Thus, if bit line "n" is "set true" and the State Machine 600 places a Strobe 1 signal to Gate S1 (FIG. 5), then the designate flip-flop DESFn will be toggled. This will cause DESFn to place a signal on AND gate Dn which is combined with the "non-A>B" signal from Comparator 100c (described hereinafter and assuming an address A=B). The two input signals to AND gate Dn will activate line DESn to select the upper half of RAM $500_m$ for addressing while NOR gate Di will take the "active A=B" signal from Comparator 100c to do a chip select on RAM $550_m$. The lower half of $550_m$ is used as buffer for Data Link Interface operations to the main host computer.

Similarly if the State Machine Processor sets, for example, the bit line 0, then DESF0 will be toggled to send a signal to gate A0. Now assuming Comparator 100c received an address A (from SM 600) where A is greater than B (A>B) as for example where A=01111 and B=01110, then the A>B line is activated to energize "LARAMSEL" line which connects to gates A0 and A3. Now when the output of DESF0 complements the LARAMSEL line, it causes a chip select of RAM 50HD m1. And likewise, an input signal to input line A11 of RAM $50_{m1}$ will select the upper half of $50_{m1\,for\,addressing}$.

After a particular upper/lower part of a "chip-selected" RAM has been enabled and addressed, then data can be "written" into the RAM via I/O bus 10 (FIGS. 5, 6) or data can be "read-out" via MEMOUT bus 12. This is controlled by a signal input MEMWR/- (memory write/) from the State Machine 600.

In the operation of the multiple Line Adapter organization, a main host computer will instruct the State Machine Microprocessor 600 (FIGS. 1, 3, 5) to execute data transfers to and from remote terminals. The data transferred in these operations will be buffered in the particular RAM memory dedicated to the particular Line Adapter used.

For example, the Line Adapter 0 (407, 408 of FIG. 2) will have a dedicated one-half portion of RAM $50_{m1}$ of FIG. 2 for its exclusive use. The other half of RAM $50_{m1}$ will be exclusively dedicated to Line Adapter 1 (409, 410 of FIG. 2). Likewise, Ram $50_{m2}$ will have one-half dedicated to Line Adapter 2 (411, 412) and one-half to Line Adapter 3 (413,414).

Thus in the operating cycle, the system will have to "designate" (choose, select) certain of the available memory areas in conjunction with data transfer operations.

It may be noted that the Data Link Interface/Line Adapter Card 700 (of FIGS. 1, 5) also has a RAM $550_m$ (FIG. 5) which provides an "upper" portion and a "lower" portion dedicated respectively to a Line Adapter (upper) and to the Data Link Interface (lower).

The RAM memory areas are used to buffer or accumulate data; whence the microprocessor can then instruct the data to be transferred via a selected Line Adapter to a remote terminal, or the microprocessor can instruct data transfer to the main host computer.

There are certain situations where the State Machine Microprocessor 600 must turn-on (select) a Designate flip-flop unit such as DESF0, DESF1, DESF2, DESF3, etc. shown in FIGS. 5 and 6. These situations involve the following:

(a) The State Machine 600 (under instructions from the main host computer) has to select a given Line Adapter and its dedicated RAM memory for purposes of transmitting data in the memory to a remote terminal; or to select a particular RAM memory with data to be transferred to the host computer. There are four types of memory operations involved:

(1) Host to RAM (Write) with message;
(2) RAM to Host (Read) with message;
(3) RAM (Read) to Line Adapter (USART) with byte size information for transmission to Line Adapter;
(4) Line Adapter (USART) to RAM (Write) with byte size information received from Line Adapter.

(b) The State Machine 600 was interrupted with a Service Request from a Line Adapter and must now identify the particular Line Adapter requesting service. These involve the situation where there are Interrupts or Service Request signal conditions to the State Machine 600. The State Machine Processor 600 accomplishes this by executing a "PUT OP" which accomplishes two things:

(1) It energizes the strobe 1 signal line of FIG. 5 which is sent to each and every one of the DESF flip-flops;
(2) It "sets" (turns on) a particular one of the lower 8 bit lines of I/O bus 10 (FIG. 5). For example, by setting bit line 0 to "true", this will operate through the jumper line J0 to "turn on" the DESF0. The output of DESF0 will signal one input of Gate A0 (FIG. 5). It may be noted that when the LARAMSEL signal is also "energized" (turned on), then the Line Adapter RAM $50_{m1}$ (FIGS. 2 and 5) will be enabled (selected) so that incoming addresses (MADDR 0–10) will be effective to address that particular memory location.

Thus, the State Machine Processor 600, by its PUT OP execution, has turned on a flip-flop, DESF, which relates to and identifies a particular Line Adapter.

Additionally, it should be mentioned that the DLI/LA card also has a RAM ($500_m$, FIG. 5) which can be "designated" via the "turn on" of the DESFn flip-flop which the State Machine 600 accomplishes via setting the bit line "n" of FIG. 5.

Any DESF flip-flop unit can only be set if it receives the Strobe 1 signal and the appropriate bit line signal. After this, the output of the DESF flip-flop must be "ANDED" (via Dn, A0, A3, FIG. 5) with the appropriate output signal from the Comparator 100c of FIG. 5 to be hereinafter described.

After the particular Line Adapter and its associated RAM is "designated" by "turn on" of the particular DESF flip-flop, the State Machine Processor 600 will initiate a MEMORY READ or WRITE OP in which the State Machine will generate a "memory address" (MADDR) of 16 bits. These address lines are shown in FIG. 5 while FIG. 6 shows 11 of the 16 address lines.

As seen in FIG. 5, the address bits 11–15 are inputted to Comparator 100c where a decision is made as to whether to select the "remote" DLI RAM $550_m$ (FIGS. 1 and 5) or to select local "other RAMs" (non-DLI).

Thus, if memory address bits [15:5] are 01110, this makes the A inputs equal to the B inputs of Comparator 100c, and when A=B, the output line of A=B will energize NOR gate $D_i$ (also $D_s$) in order to chip select RAM $550_m$.

However, if the address bits 11–15 read 01111, this makes A inputs greater than B inputs (A>B) and this will "turn on" the line designated LARAMSEL (Line Adapter RAM Select) which forms inputs to NAND gates such as A1, A3 of FIGS. 5, 6. Thus, depending on which DESF flip-flop is "on" as input to A0, A3, then that RAM ($50_{m1}$ or $50_{m2}$) will be chip selected or enabled.

As noted in FIGS. 5 and 6, each RAM has an address input line designated "A11" which provides the means whereby the output of any associated DESF flip-flop can be input to the RAM (via an NAND gate such as $D_n$). Thus, by using the A11 input line, the upper half or lower half of any RAM can be "enabled" for use (assuming it was "chip selected" as previously described).

Now, the other memory address bits 0–10 (which are sent by the State Machine 600 to all the RAMs) will only be operative on the particular RAM memory which was:

(1) chip selected (as described), and
(2) selected as to the upper half or lower half (of the RAM) through the A11 input to the RAM.

In summary, the selection system for designating and accessing a particular memory in a network using multiple memories involves:

(1) the State Machine Processor 600 turning on a flip-flop DESF which identifies a particular Line Adapter having a particular RAM memory;
(2) addressing a comparator which chooses one of two options:
 (a) the DLI RAM ("remote") on the DLI/LA interface card 700, or
 (b) all other possible Line Adapter RAM memories (local).
(3) using gates to combine the output signals of (a) and (b) above to thus chip select a given RAM;
(4) using an input signal (A11 derived from an activated DESF) to select either the "upper" or "lower" half of the RAM which was "chip selected".
(5) using address (bits 0–10) data from the State Machine 600 to access the particular RAM memory area in the selected (upper or lower) part of the RAM which was "chip selected".

The division of RAM for the first or second data comm line on a Quad Line Adapter LA is handled by controlling the A-11 address pin on the RAM chip with a signal line DES0/A: and for the third and fourth line, the A-11 pin on the second group of RAM chips is controlled by a signal line DES2/A. FIG. 5 shows the $DES_n$ line which is typical for all RAMs of the various Line Adapters involved.

A "Dual" or a "Single" Line Adapter will only contain one group of memory chips and will operate the same as data comm line 0 and line 1 on a "Quad" Line Adapter. Data to be written into a RAM must be placed on the I/O bus 10 by the State Machine 600; and Read data will be sent to the State Machine on the MEMOUTnn bus 12 (nn equals 00→16).

Clear: Two clearing methods are used on the Line Adapter: (i) Power-up Clear and (ii) Designate Clear.

Three components on a Line Adapter are cleared by the "Power Up" Clear: these are the (i) Designate flip-flop; (ii) Auto Call Output Register; (iii) the Bit-Oriented Controlled (BOC).

There are two components on a Line Adapter which are cleared by the "Designate Clear": these are (i) Auto Call Output Register and (ii) the Bit-Oriented Controller (BOC).

When executing the "Designate Clear", the Line Adapters must be "designated", and the clear bit, (bit 7) in the First Control Register 37 must be maintained for a minimum of 1 microsecond. This is required for clearing the Bit-Oriented Controller via a pin marked as the MR pin.

What is claimed is:

1. In a line support processor for controlling data transfer operations between a host computer and a remote data terminal wherein said line support processor includes a plurality of line adapters, a data link interface unit and a microprocessor means, said microprocessor means including program data in an internal ROM and in external RAM storage means and having an I/O bus and output control registers providing control data and information data to said line adapters, a line adapter memory selection system comprising:

(a) a plurality of line adapters wherein each line adapter includes:
  (a1) input/output circuit means connecting a data terminal to a first switching means;
  (a2) first switching means, controlled by said microprocessor, for transferring data from said microprocessor means to said input/output circuit means, or transferring data from said input/output circuit means to a multiplexor means;
  (a3) multiplexor means, having an output to said I/O bus, for conveying data bytes from a selected one of said input/output circuit means;
  (a4) line adapter memory means, connected to said I/O bus, for buffering data being transferred between said microprocessor means and said data terminal; said line adapter memory means including a plurality of RAM storage means, each one of said RAM storage means being dedicated to a set of first and second line adapters and having upper and lower memory areas dedicated respectively to said first and second line adapters;

(b) means for selecting a particular area of a line adapter memory means and addressing said area of line adapter memory means;

(c) said microprocessor means for transmitting identification signals to said means for selecting and for generating address data to said means for selecting.

2. The memory selection of claim 1, wherein said means for selecting includes:
(a) logic circuit means for receiving said identification signals and address data from said microprocessor means for selectively enabling an upper or lower memory area of a selected line adapter RAM storage means so that said area may be accessed for data to be stored within or read out.

3. In a data-communication network using a system of multiple line adapters operatively controlled by a microprocessor means and wherein "local" multiple line adapters are each provided with RAM memory storage means and interface lines to a data link interface circuit having "remote RAM storage means", said interface circuit connected for data transfer with a main host computer, a selection system for selective enabling of RAM memory means dedicated to a particular local or remote line adapter and permitting addressing of the selected RAM memory storage means, the selection system comprising:

(a) said microprocessor means having an I/O bus made of individual bit-lines connected to each one of a plurality of RAM memory storage means, said microprocessor means also having memory address lines to each one of said RAM memory storage means, said microprocessor means including:
  (a1) means to set any one individual bit-line of said I/O bus wherein each bit-line is connected to a separate designate flip-flop unit associated with each RAM memory means;
  (a2) means to transmit a strobe signal to each one of a plurality of designate flip-flop units;

(b) a plurality of RAM memory storage means wherein each one of said memory storage means is dedicated to a particular line adapter, each one of said storage means including:
  (b1) a RAM chip select input line connected to a selection logic means for enabling said RAM storage means to be addressed via said address lines;
  (b2) an upper/lower input select line connected to said selection logic means for enabling the upper or lower half of said RAM storage means;

(c) said selection logic means connected to said microprocessor means and including:
  (c1) means to enable a selected upper or lower section of a designated one of said RAM memory storage means, said means including:
    (c1a) a plurality of designate flip-flop units wherein each flip-flop unit is connected to said microprocessor means and used to identify each RAM memory storage means.

4. The system of claim 3, wherein said means for enabling RAM storage includes:
(a) gating means connected to provide an output signal to said RAM chip-select input line, said gating means including:
  (a1) AND gate means having a first and second input, said first input connected to the output of a comparator means, and said second input connected to the output of a NOR gate activated by either one of a pair of designate flip-flops $DESF_n$ and $DESF_{n+1}$ where n is a zero or an even number, and n+1 is an odd number;
  (a2) said NOR gate connected to be activated by either designate flip-flop unit n or n+1 and wherein said flip-flop unit n+1 is connected to an upper/lower select input of said RAM memory storage means;

(b) comparator means connected to receive memory address data from said microprocessor means, and for generating a signal to said first input of said AND gate means to determine selection of local RAM storage means or of remote RAM storage means.

5. In a data-communication network using a system of multiple line adapters operatively controlled by a microprocessor means and wherein "local" multiple line adapters are each provided with RAM memory storage means and interface lines to a data link interface circuit having "remote RAM storage means", said interface circuit connected for data transfer with a main host computer, a selection system for selective enabling of RAM memory means dedicated to a particular local or remote line adapter and permitting addressing of the selected RAM memory storage means, the selection system comprising:

(a) a plurality of local RAM memory storage means, each such RAM means being dedicated to a particular one of said plurality of line adapters;

(b) a remote RAM memory storage means located adjacent said data link interface;
(c) wherein each of said local and remote RAM memory storage means includes:
 (c1) a chip-select input for enabling said RAM memory storage means when said chip-select input is activated;
 (c2) an upper/lower select input for enabling either said upper half or lower half of said RAM storage means;
 (c3) memory address input lines from said microprocessor means; (d) microprocessor means having an I/O bus made of individual bit-lines connected to each one of said local and remote RAM memory means for data transfer into said memory means, and further including:
 (d1) memory address lines to each one of said RAM memory means for addressing said memory means when it is enabled, and address lines to a selection logic means;
 (d2) means to set any one individual bit-line of said I/O bus to generate a designation signal to said selection logic means;
 (d3) means to generate a strobe signal to said selection logic means;
(e) selection logic means for choosing either the local or the remote RAM storage means and then enabling a designated RAM storage means, said selection logic means including:
 (e1) means to receive said designation signal and said strobe signal for activating a gating means;
 (e2) comparator means for receiving address data from said micoprocessor means and for signaling a gating means as to local or remote selection;
 (e3) gating means for enabling a designated RAM storage means to receive address data from said microprocessor means.

* * * * *